United States Patent [19]

Frohberg et al.

[11] Patent Number: 5,136,988

[45] Date of Patent: Aug. 11, 1992

[54] AIR INTAKE ARRANGEMENT

[75] Inventors: David L. Frohberg, Peoria; Carl L. McClung, Metamora, both of Ill.

[73] Assignee: Caterpillar Inc., Peoria, Ill.

[21] Appl. No.: 747,303

[22] Filed: Aug. 19, 1991

[51] Int. Cl.⁵ .............................................. F02M 35/10
[52] U.S. Cl. ......................... 123/52 MB; 123/52 MV
[58] Field of Search .......... 123/52 M, 52 MB, 52 MV

[56] References Cited

U.S. PATENT DOCUMENTS

| 3,171,393 | 3/1965 | Platner et al. | 123/52 MV |
| 3,872,843 | 3/1975 | Stewmuller | 123/52 MV |
| 4,641,610 | 2/1987 | Rutschmann | 123/52 MV |
| 4,671,216 | 6/1987 | Itoh | 123/52 MV |
| 4,846,117 | 7/1989 | Hitomi et al. | 123/52 MV |
| 4,917,202 | 4/1990 | Glover, Jr. et al. | 180/68.3 |
| 5,056,472 | 10/1991 | Kurokawa et al. | 123/52 MV |

OTHER PUBLICATIONS

Parts book for a Caterpillar 789 truck powered by a 3516 engine by Caterpillar Inc. Issued: Aug., 1990.

Primary Examiner—David A. Okonsky
Attorney, Agent, or Firm—Calvin E. Glastetter

[57] ABSTRACT

Air intake systems having filters are useful for removing airborne particles from the air flow. When two filters are used in two separate air systems, one of the filters could become restricted before the other and require more frequent service. The subject air intake arrangement includes a balance tube connected between a first air supply and a second air supply to balance the rate at which the filters become restricted. This arrangement of components will tend to draw more air through the cleaner filter until it is restricted the same degree as the other filter.

5 Claims, 1 Drawing Sheet

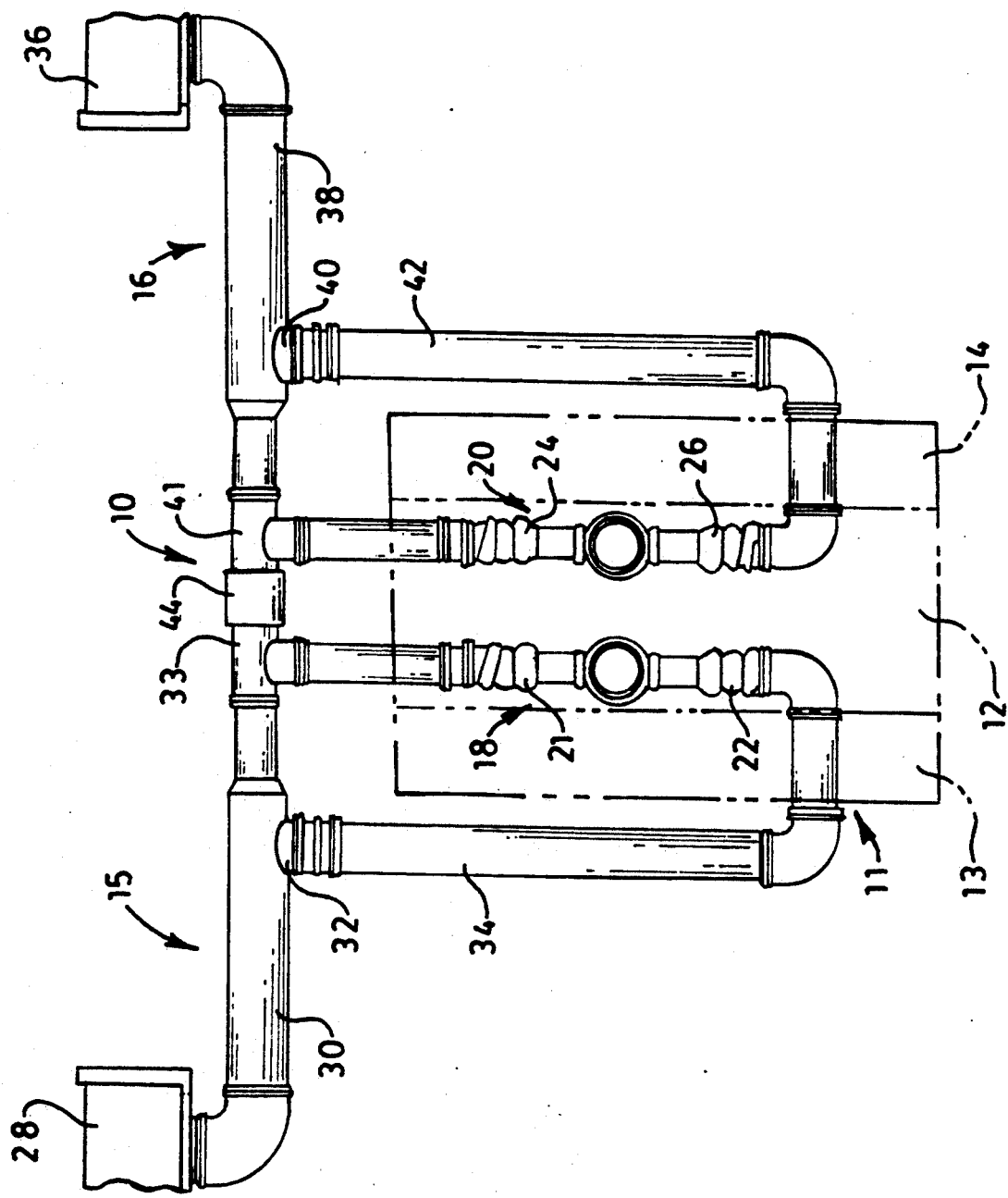

AIR INTAKE ARRANGEMENT

TECHNICAL FIELD

This invention relates generally to an air intake arrangement for an engine and more particularly to an arrangement for connecting two separate air supply systems to balance the intake of air at the filters.

BACKGROUND ART

In large earthmoving vehicles it is common to use two separate air filters and tube arrangements to supply air to the cylinders of an engine having a v-configuration or an in-line configuration. One of the filters and one of the tube arrangements is used to supply air to one of the turbochargers and a similar arrangement is used to supply air to the opposite turbocharger. When the engine is in use air is ingested through the filter elements to remove airborne particles. If one of the filters is operating in an environment which contains more airborne particles, it will become restricted before the other filter element; therefore, it will need to be serviced sooner.

DISCLOSURE OF THE INVENTION

In one aspect of the present invention, an air intake arrangement is provided that includes a first air supply system having a first air filter. A second air supply system has a second air filter, and a balance tube is connected between the first air supply system and the second air supply system downstream of the air filters.

BRIEF DESCRIPTION OF THE DRAWINGS

The drawing is a diagrammatic plan view showing the present invention.

BEST MODE FOR CARRYING OUT THE INVENTION

An air intake arrangement 10 is provided for supplying air to an engine 11. The engine 11 includes an aftercooler 12, a first bank or group of cylinders 13 and a second bank or group of cylinders 14. The air intake arrangement includes a first air supply system 15 and a second air supply system 16. The first air supply system 15 is used to supply air to a first turbocharger arrangement 18. The second air supply system 16 is used to supply air to a second turbocharger arrangement 20. Each of the turbochargers has a compressor end and a turbine end. The first turbocharger arrangement 18 includes a first turbocharger 21 and a second turbocharger 22 which supply compressed air to the aftercooler 12 which supplies compressed air to the first bank of cylinders 13. The second turbocharger arrangement 20 includes a third turbocharger 24 and a fourth turbocharger 26 which supply compressed air to the aftercooler 12 which supplies compressed air to the second bank of The first air supply system 15 includes a left or first air filter 28 for removing airborne particles from the air. A first left tube 30 is connected between the left air filter 28 and the compressor end of first turbocharger 21. The first left tube 30 has a first connector 32 and a second connector 33. A second left tube 34 is connected between the first connector 32 and the compressor end of the second turbocharger 22.

The second air supply system 16 includes a right or second air filter 36 for removing airborne particles from the air. A first right tube 38 is connected between the right air filter 36 and the compressor end of the third turbocharger 24. The first right tube 38 has a first connector 40 and a second connector 41. A second right tube 42 is connected between the first connector 40 and the compressor end of the fourth turbocharger 26.

A balance tube 44, downstream of the filters 28,36, is connected between the second connector 33 of the first left tube 30 of the first air supply system 15 and the second connector 41 of the first right tube 38 of the second air supply system 16.

INDUSTRIAL APPLICABILITY

The air intake arrangement 10 of the present invention uses a balance tube 44, downstream of the air filters 28,36, to connect the first left tube 30 to the first right tube 38. When the engine 11 is in use equal amounts of air is pulled through the left filter 28 and the right filter 36. As air is pulled through the filters 28,36 any entrained particles will be collected by the filters 28,36. After prolonged use the particles will tend to restrict the air filters. If, for example, the right filter 36 is positioned in a dirtier environment, it will become restricted faster than the left filter 28. With the balance tube 44 in the air intake arrangement 10 and the right filter 36 is partially restricted, more air will be drawn in through the left filter 28. With more air flowing through the left filter it will collect more particles than the right filter until it is restricted the same amount as the right filter With both filters restricted the same amount the air flow through the filters is again equalized and the air flow through the filters will be the same. This arrangement will restrict the left and right filters 28,36 at the same rate so that one filter will not need to be serviced before the other.

In view of the foregoing, it is readily apparent that the structure of the present invention provides a balanced air intake arrangement which will prevent one filter from being restricted while the other is being under utilized. With the two air supply systems being interconnected, the filters will be restricted at the same rate; therefore, they will need to be serviced at the same interval.

Other aspects, objects and advantages of this invention can be obtained from a study of the drawing, the disclosure and the appended claims.

We claim:

1. An air intake arrangement for supplying air to banks of cylinders of an engine, comprising:
   a first air supply system having a first air filter supplying air to the first bank of cylinders of the engine, the first air supply system includes a first tube connected between the first air filter and a first turbocharger;
   a second air supply system having a second air filter supplying air to the second bank of cylinders of the engine, second air supply system includes a first tube connected between the second air filter and a third turbocharger;
   a balance tube connected between the first tube of the first air supply system and the first tube of the second air supply system downstream of the filters to balance the air intake of the filters.

2. The air intake arrangement of claim 1 wherein the first air supply system includes a second tube connected between the first tube and a second turbocharger.

3. The air intake arrangement of claim 2 wherein the second air supply system includes a second tube connected between the first tube and the fourth turbocharger.

4. The air intake arrangement of claim 3 wherein the first and second turbochargers supply air to an aftercooler which supplies air to the first bank of cylinders.

5. The air intake arrangement of claim 4 wherein the third and fourth turbochargers supply air to an aftercooler which supplies air to the second bank of cylinders.

* * * * *